(12) United States Patent
Oh et al.

(10) Patent No.: US 11,349,518 B2
(45) Date of Patent: May 31, 2022

(54) COVER FOR PORTABLE TERMINAL

(71) Applicant: AMOSENSE CO., LTD., Cheonan-si (KR)

(72) Inventors: Se Min Oh, Incheon (KR); Hyung Il Baek, Yongin-si (KR); Yong Ho Hwang, Seoul (KR); Seung Yeob Yi, Suwon-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 0 days.

(21) Appl. No.: 16/764,818

(22) PCT Filed: Nov. 14, 2018

(86) PCT No.: PCT/KR2018/013912
§ 371 (c)(1),
(2) Date: May 15, 2020

(87) PCT Pub. No.: WO2019/098675
PCT Pub. Date: May 23, 2019

(65) Prior Publication Data
US 2020/0358469 A1    Nov. 12, 2020

(30) Foreign Application Priority Data

Nov. 16, 2017 (KR) .......................... 10-2017-0153160

(51) Int. Cl.
*H04B 1/00* (2006.01)
*H04B 1/3888* (2015.01)
(Continued)

(52) U.S. Cl.
CPC ............ *H04B 1/3888* (2013.01); *G16Y 10/75* (2020.01); *G16Y 20/30* (2020.01); *H01Q 1/273* (2013.01); *H02J 50/001* (2020.01)

(58) Field of Classification Search
CPC ...... H04B 1/3888; G16Y 10/75; G16Y 20/30; H02J 50/001; H01Q 1/273
(Continued)

(56) References Cited

U.S. PATENT DOCUMENTS 9,059,505 B1 * 6/2015 Asrani .................. H01Q 9/145
9,888,599 B2 * 2/2018 Park ...................... G06F 1/3265
(Continued)

FOREIGN PATENT DOCUMENTS

JP        20100136216 A    6/2010
KR       10-1549027 B1    9/2015
(Continued)

*Primary Examiner* — Md K Talukder
(74) *Attorney, Agent, or Firm* — Maschoff Brennan

(57) ABSTRACT

Suggested is a cover for a portable terminal which is driven by receiving wireless power from a portable terminal and performs communication with an IoT device by using the portable terminal having no IoT communication module embedded therein by performing communication with the IoT device via IoT communication. The suggested cover for a portable terminal comprises: a first antenna module for generating driving power through energy harvesting with a portable terminal; and a second antenna module and a third antenna module driven by the driving power, wherein one of the first antenna module and the second antenna module collects IoT data from the portable terminal, and wherein the third antenna module transmits the IoT data, collected by one of the first antenna module and the second antenna module, to an external IoT device.

20 Claims, 12 Drawing Sheets

(51) Int. Cl.
*G16Y 10/75* (2020.01)
*H02J 50/00* (2016.01)
*G16Y 20/30* (2020.01)
*H01Q 1/27* (2006.01)

(58) Field of Classification Search
USPC ............................... 455/41.1, 41.2, 41.3
See application file for complete search history.

(56) References Cited

U.S. PATENT DOCUMENTS

| | | | | |
|---|---|---|---|---|
| 10,437,295 | B1* | 10/2019 | Filipovic | G06F 1/183 |
| 2004/0259499 | A1* | 12/2004 | Oba | H04W 8/005 |
| | | | | 455/39 |
| 2010/0144273 | A1* | 6/2010 | Sekikawa | H04N 1/00347 |
| | | | | 455/73 |
| 2014/0065948 | A1* | 3/2014 | Huang | H04B 1/3888 |
| | | | | 361/679.01 |
| 2014/0370804 | A1* | 12/2014 | Doming | H04B 5/0037 |
| | | | | 455/41.1 |
| 2016/0007138 | A1* | 1/2016 | Palanisamy | H04W 4/70 |
| | | | | 455/41.2 |
| 2016/0072303 | A1* | 3/2016 | Jeong | H04B 5/0037 |
| | | | | 307/104 |
| 2016/0204501 | A1* | 7/2016 | Bringuier | H04B 5/0087 |
| | | | | 343/702 |
| 2016/0285151 | A1* | 9/2016 | Lee | H01Q 5/321 |
| 2017/0163076 | A1* | 6/2017 | Park | H02J 50/80 |
| 2017/0214434 | A1* | 7/2017 | Hong | H04W 12/06 |
| 2017/0244822 | A1* | 8/2017 | Park | H04B 5/0031 |
| 2019/0020382 | A1* | 1/2019 | Chritz | H04W 28/08 |
| 2019/0183092 | A1* | 6/2019 | Couse | A01K 11/006 |

FOREIGN PATENT DOCUMENTS

| | | | | |
|---|---|---|---|---|
| KR | 10-2015-0141366 | A | 12/2015 | |
| KR | 20150141366 | * | 12/2015 | ............... H04B 5/00 |
| KR | 10-1667884 | B1 | 10/2016 | |

* cited by examiner

COVER FOR PORTABLE TERMINAL

TECHNICAL FIELD

The present disclosure relates to a cover for a portable terminal, and more particularly, to a cover for a portable terminal which is fastened to a portable terminal to support IoT communication.

BACKGROUND ART

Recently, with the development of the Internet of Things technology, various IoT devices such as a mobile phone, mechanical equipment, a sensor, and a home appliance are connected to the Internet to provide more valuable information and services to users.

In order to provide various services through the Internet of Things (IoT) platform, it is necessary to collect IoT data necessary for providing the service. The IoT data is generally collected through various sensor devices. For example, in order to provide a service of providing information about weather, it is necessary to install sensor devices, which measure temperature, humidity, fine dust concentration, precipitation, and the like, at a number of positions across the country to measure the corresponding data to provide the measured data of the sensor to the IoT platform.

DISCLOSURE

Technical Problem

The present disclosure is proposed in consideration of the aforementioned circumstances, and an object of the present disclosure is to provide a cover for a portable terminal, which is driven by receiving wireless power from a portable terminal, and performs communication with an IoT device through IoT communication to perform the communication with the IoT device by using a portable terminal in which no IoT communication module is embedded.

Further, another object of the present disclosure is to provide an IoT communication module and a communication device including the same, which may collect IoT data directly from an IoT gateway through IoT communication, and provide the IoT data to a portable terminal to communicate with an IoT device by using a portable terminal in which no IoT communication module is embedded.

Technical Solution

For achieving the objects, a cover for a portable terminal according to an exemplary embodiment of the present disclosure, as the cover for the portable terminal fastened to the portable terminal which collects IoT data from a field IoT device, includes: a first antenna module which generates driving power through energy harvesting with the portable terminal, a second antenna module which is driven by the driving power generated by the first antenna module, and a third antenna module which is driven by the driving power generated by the first antenna module, and one of the first antenna module and the second antenna module collects IoT data from the portable terminal, and the third antenna module transmits the IoT data collected by one of the first antenna module and the second antenna module to an external IoT device.

For achieving the objects, a cover for a portable terminal according to another exemplary embodiment of the present disclosure, as the cover for the portable terminal fastened to the portable terminal, includes: a first antenna module which generates driving power through energy harvesting with the portable terminal, a second antenna module which is driven by the driving power generated by the first antenna module, and collects IoT data from one or more field IoT devices, and a third antenna module which is driven by the driving power generated by the first antenna module, and transmits the IoT data collected by the second antenna module to an external IoT device.

Advantageous Effects

According to the present disclosure, the cover for the portable terminal may be driven by receiving the wireless power from the portable terminal to operate even without the separate power source. That is, the cover for the portable terminal may operate even without the separate power source by using the energy generated when the NFC function of the portable terminal is activated through energy harvesting with power.

Further, the cover for the portable terminal may perform the communication with the IoT device through the IoT communication, thereby performing the communication with the IoT device by using the portable terminal in which no IoT communication module is embedded.

Further, the cover for the portable terminal may transmit the IoT data to the external IoT device through the IoT network, thereby minimizing the communication cost as compared to the conventional IoT system using the carrier network.

Further, the cover for the portable terminal may support the IoT communication between the portable terminal and the IoT gateway not to use the carrier network or the IoT network incurring the cost, thereby minimizing the communication cost.

MODE FOR INVENTION

Figure 1:
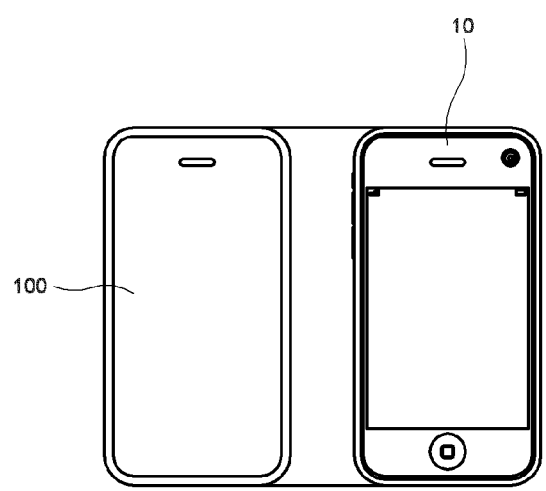
FIGS. 1 and 2 are diagrams for explaining a cover for a portable terminal according to a first exemplary embodiment of the present disclosure.

Hereinafter, the most preferred exemplary embodiment of the present disclosure will be described in detail with reference to the accompanying drawings so that those skilled in the art to which the present disclosure pertains may easily practice the technical spirit of the present disclosure. First, in adding reference numerals to the components of each drawing, it should be noted that the same components are denoted by the same reference numerals as much as possible even if displayed on different drawings. Further, in describing the present disclosure, when it is determined that the detailed description of the related known configuration or function may obscure the gist of the present disclosure, the detailed description thereof will be omitted.

Figure 2:
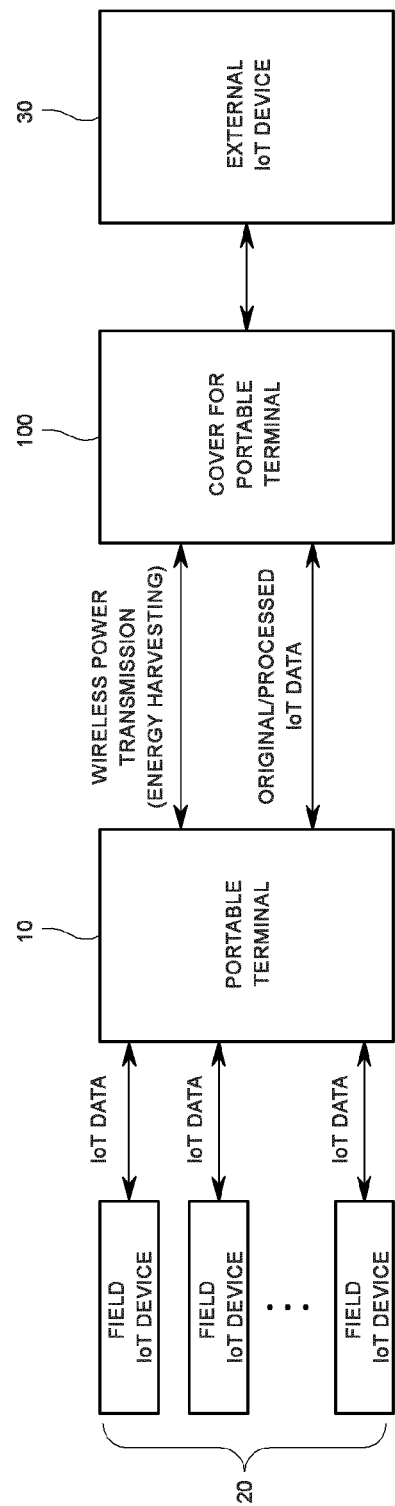

Referring to FIGS. 1 and 2, a cover for a portable terminal 100 according to a first exemplary embodiment of the present disclosure is a protective cover which is coupled to a portable terminal 10. The cover for the portable terminal 100 is fastened to the portable terminal 10 in which no IoT communication module such as LoRa, Sigfox, or NB-IoT, or a UWB communication module is mounted.

The cover for the portable terminal 100 receives driving power from the portable terminal 10 through energy harvesting (or wireless power transmission). The cover for the portable terminal 100 has no separate power supply (for example, battery) embedded therein, and is driven by electric power generated by the energy harvesting.

The cover for the portable terminal 100 serves as a gateway between the portable terminal 10 without an IoT communication function and an external IoT device 30. As an example, the external IoT device 30 is an IoT server which is connected to an IoT network.

The portable terminal 10 collects IoT data from a field IoT device 20 through short range communication such as Bluetooth. The portable terminal 10 transmits the IoT data collected through the short range communication to the cover for the portable terminal 100. At this time, the portable terminal 10 transmits the processed IoT data (hereinafter, processed IoT data) or the IoT data received from the field IoT device 20 (hereinafter, original IoT data) to the cover for the portable terminal 100.

The cover for the portable terminal 100 may provide a plurality of communication methods for transceiving the IoT data with the portable terminal 10. The cover for the portable terminal 100 may also change the communication method based on the size of the IoT data and the number of field IoT devices 20 connected to the portable terminal 10. The cover for the portable terminal 100 receives the IoT data from the portable terminal 10 through one of the communication methods such as Near Field Communication (NFC), Bluetooth Low Energy (BLE), and Wi-Fi.

The cover for the portable terminal 100 transmits the processed IoT data or the original IoT data to the external IoT device 30 through the IoT communication network. At this time, the cover for the portable terminal 100 transmits the IoT data through the IoT communication network such as LoRa, Sigfox, and NB-IoT.

Figure 3:
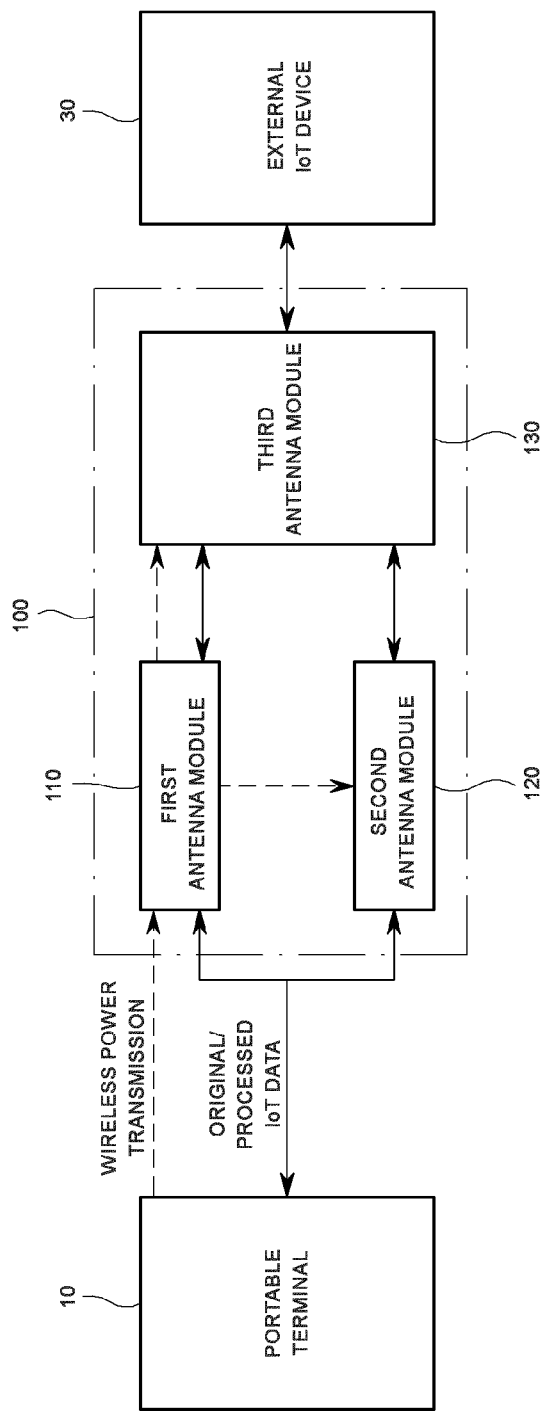
FIG. 3 is a diagram for explaining a configuration of the cover for the portable terminal according to the first exemplary embodiment of the present disclosure.

To this end, referring to FIG. 3, the cover for the portable terminal 100 includes a first antenna module 110, a second antenna module 120, and a third antenna module 130. Here, as an example, the first antenna module 110 is an NFC antenna module capable of energy harvesting and short range communication, the second antenna module 120 is a Bluetooth Low Energy (BLE) antenna module capable of operating at low power, and the third antenna module 130 is an antenna module such as LoRa, Sigfox, or NB-IoT which may be connected to the IoT network.

The first antenna module 110 performs energy harvesting (or wireless power transmission) with the portable terminal 10. The first antenna module 110 generates driving power source (or driving power) through energy harvesting (or wireless power transmission) with the portable terminal 10. The first antenna module 110 selectively supplies driving power source to the second antenna module 120 and the third antenna module 130.

The first antenna module 110 receives power from the portable terminal 10. The first antenna module 110 receives power through energy harvesting (or wireless power transmission) with the portable terminal 10. As an example, the first antenna module 110 receives power through energy harvesting (or wireless power transmission) with the NFC antenna module embedded in the portable terminal 10. The first antenna module 110 performs wireless power transmission with the portable terminal 10 in one of a magnetic resonance method or a magnetic induction method.

The first antenna module 110 supplies the power supplied from the portable terminal 10 to the second antenna module 120 and the third antenna module 130 through wireless power transmission.

The second antenna module 120 is driven by the driving power supplied through the first antenna module 110. The second antenna module 120 transmits and receives data to and from the portable terminal 10. Since the power supplied from the first antenna module 110 is lower than the power supplied from the portable terminal 10, the second antenna module 120 is configured as a short range communication antenna module with low power consumption.

The second antenna module 120 receives data from the portable terminal 10. The second antenna module 120 receives the processed IoT data or the original IoT data from the portable terminal 10.

The third antenna module 130 transmits IoT data to the external IoT device 30 through the IoT network. The third antenna module 130 receives the processed IoT data or the original IoT data from the second antenna module 120. The third antenna module 130 transmits the received processed IoT data or original IoT data to the external IoT device 30.

When the app is executed, the portable terminal 10 activates short range communication (BLE), and supplies power to the cover for the portable terminal 100 through energy harvesting (that is, wireless power transmission). At this time, the portable terminal 10 collects the IoT data from the field IoT device 20 through short range communication (BLE).

The cover for the portable terminal 100 is paired with the portable terminal 10 by driving the second antenna module 120 as the power is supplied from the portable terminal 10 through the first antenna module 110. The cover for the portable terminal 100 drives the third antenna module 130 to be connected to the IoT network (for example, LoRa). The portable terminal 10 transmits the IoT data to the external IoT device 30 through the cover for the portable terminal 100.

Meanwhile, the first antenna module 110 may selectively supply power to the second antenna module 120 based on the amount of data transceived with the portable terminal 10. At this time, when the size of the IoT data to be received from the portable terminal 10 is a first setting size or more and the number of field IoT devices 20 connected to the portable terminal 10 exceeds the setting number, the first antenna module 110 supplies power to the second antenna module 120.

The first antenna module 110 may also perform short range communication with the portable terminal 10. The first antenna module 110 is driven by receiving wireless power through energy harvesting (or wireless power transmission), and receives the IoT data from the portable terminal 10.

The first antenna module 110 receives the processed IoT data or the original IoT data from the portable terminal 10 according to the amount of data to be received from the portable terminal 10. When the size of data to be received from the portable terminal 10 (that is, processed IoT data or original IoT data) is the first setting size or less and the number of field IoT devices 20 connected to the portable terminal 10 is the setting number or less, the first antenna module 110 receives the processed IoT data or the original IoT data from the portable terminal 10.

When the size of the IoT data is larger than the transmission capacity of the first antenna module 110 or the number of field IoT devices 20 connected to the portable terminal 10 increases, the first antenna module 110 has the increased amount of data to be received from the portable terminal 10. Accordingly, the first antenna module 110 applies driving power to the second antenna module 120.

The second antenna module 120 receives data from the portable terminal 10. The second antenna module 120 receives the processed IoT data or the original IoT data from the portable terminal 10. The second antenna module 120 receives IoT data exceeding the data transmission amount of the first antenna module 110 from the portable terminal 10. That is, when the size of data to be received from the portable terminal 10 (that is, processed IoT data or original IoT data) exceeds the first setting size or the number of field IoT devices 20 connected to the portable terminal 10 exceeds the first setting number, the second antenna module 120 may also receive the processed IoT data or the original IoT data from the portable terminal 10.

The third antenna module 130 transmits the IoT data to the external IoT device 30 through the IoT network. The third antenna module 130 transmits the processed IoT data or the original IoT data received from the portable terminal 10 by the first antenna module 110 or the second antenna module 120 to the external IoT device 30.

That is, when the app is executed, the portable terminal 10 activates short range communication (BLE), and supplies power to the cover for the portable terminal 100 through energy harvesting (that is, wireless power transmission). At this time, the portable terminal 10 collects the IoT data from the field IoT device 20 through short range communication (BLE).

The cover for the portable terminal 100 receives the processed IoT data or the original IoT data from the portable terminal 10 by driving the first antenna module 110 or the second antenna module 120 as the power is supplied from the portable terminal 10 through the first antenna module 110. The cover for the portable terminal 100 drives the third antenna module 130 to be connected to the IoT network (for example, LoRa). The cover for the portable terminal 100 transmits the processed IoT data or the original IoT data to the external IoT device 30 through the third antenna module 130.

Accordingly, the portable terminal 10 may transmit the IoT data to the external IoT device 30 through the cover for the portable terminal 100.

Figure 4:
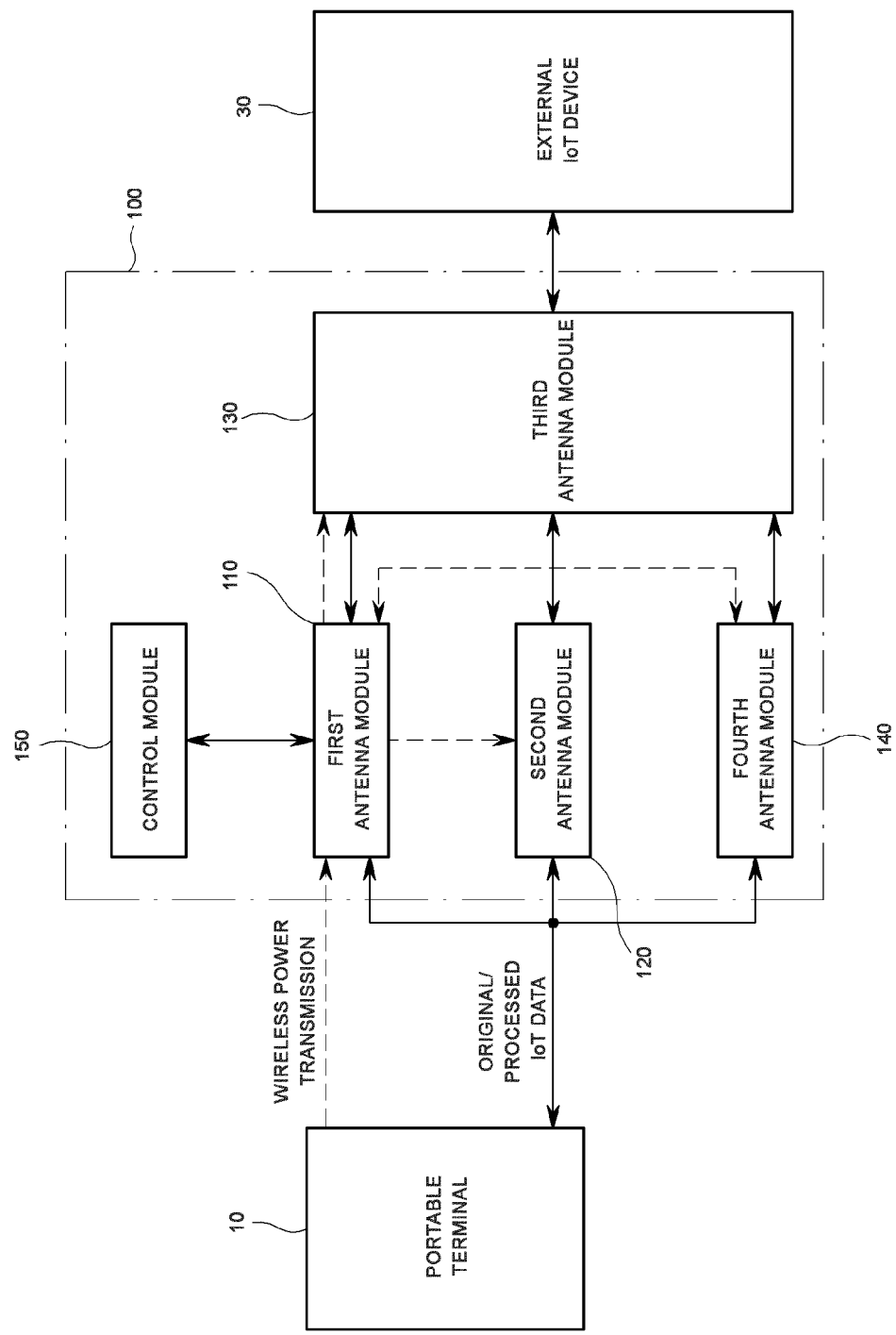
FIGS. 4 to 6 are diagrams for explaining modified examples of the cover for the portable terminal according to the first exemplary embodiment of the present disclosure.

Referring to FIG. 4, the cover for the portable terminal 100 may further include at least one of a fourth antenna module 140 and a control module 150. At this time, as an example, the fourth antenna module 140 is a Wi-Fi antenna module having a higher data transmission amount than the second antenna module 120.

The fourth antenna module 140 transmits and receives data to and from the portable terminal 10. The fourth antenna module 140 is configured as an antenna module having a higher data transmission amount than the second antenna module 120.

The fourth antenna module 140 receives data (that is, processed IoT data or original IoT data) exceeding the data transmission amount of the second antenna module 120 from the portable terminal 10. When the IoT data exceeds the data transmission amount of the second antenna module 120, the fourth antenna module 140 is driven by wireless power to receive the IoT data from the portable terminal 10.

When the size of the IoT data exceeds a second setting size or the number of field IoT devices 20 connected to the portable terminal 10 exceeds a second setting number, the fourth antenna module 140 is driven by wireless power to receive the IoT data from the portable terminal 10. Here, the second setting size and the second setting number are larger than the first setting size and the first setting number.

The control module 150 sets an antenna module to communicate with the portable terminal 10. The control module 150 sets one of the first antenna module 110, the second antenna module 120, and the fourth antenna module 140 as an antenna module to communicate with the portable terminal 10 based on the amount of data.

The control module 150 sets the first antenna module 110 as an antenna module to be communicated when the amount of data is the data transmission amount of the first antenna module 110 or less. The control module 150 sets the second antenna module 120 as an antenna module to be communicated when the amount of data exceeds the data transmission amount of the first antenna module 110 and is the data transmission amount of the second antenna module 120 or less. The control module 150 sets the third antenna module 130 as an antenna module to be communicated when the amount of data exceeds the data transmission amount of the second antenna module 120.

The control module 150 controls power supply to the antenna module set as an antenna module to be communicated. When the first antenna module 110 is set as an antenna module to be communicated, the control module 150 controls the first antenna module 110 to stop power supply to the second antenna module 120 and the fourth antenna module 140. The control module 150 controls the first antenna module 110 to stop power supply to the fourth antenna module 140 when the second antenna module 120 is set as an antenna module to be communicated. The control module 150 controls the first antenna module 110 to stop power supply to the second antenna module 120 when the fourth antenna module 140 is set as an antenna module to be communicated.

Figure 5:
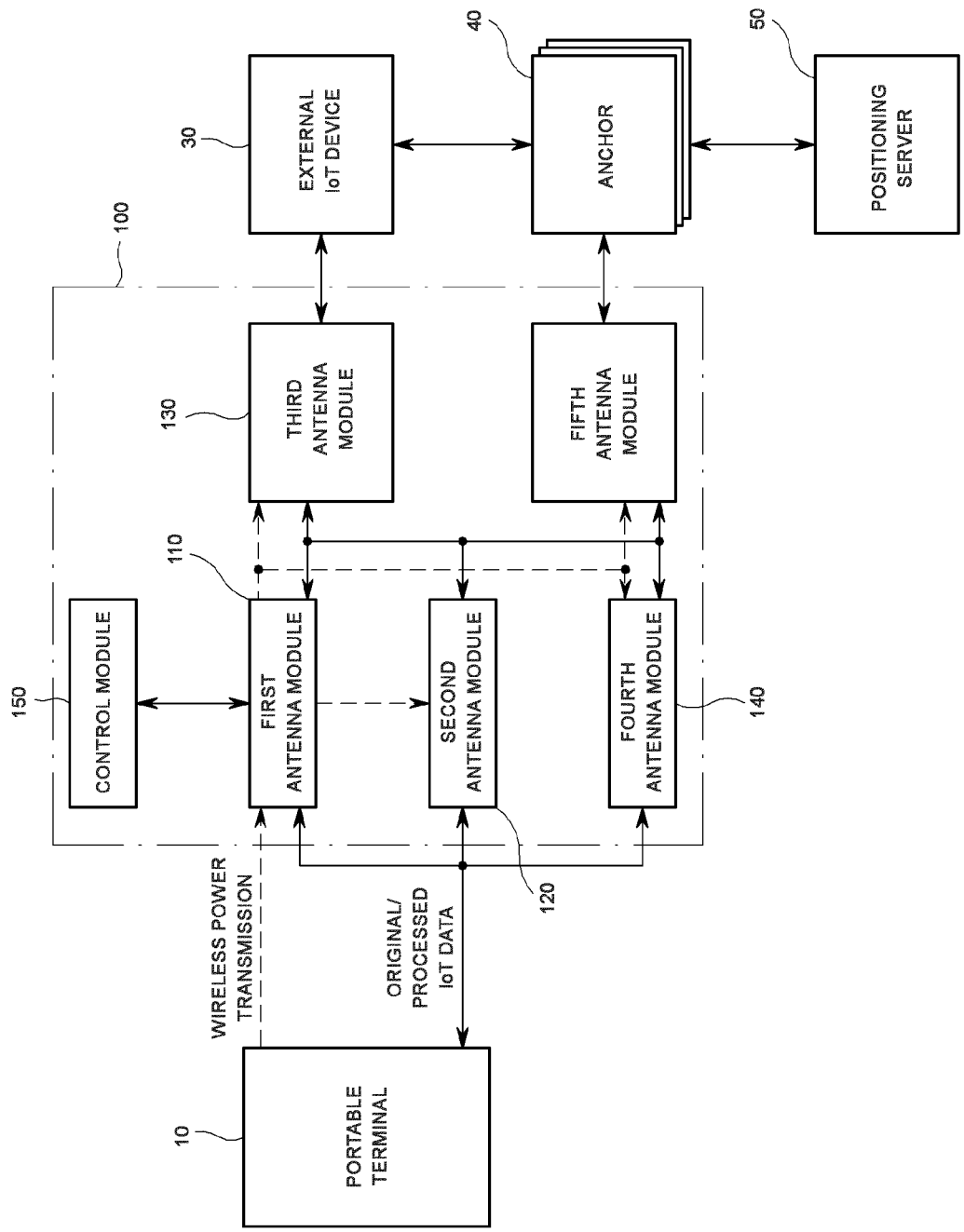

Referring to FIG. 5, the cover for the portable terminal 100 may further include a fifth antenna module 160 which performs position information positioning and short range communication. At this time, as an example, the fifth antenna module 160 is a UWB antenna module.

The fifth antenna module 160 operates by the driving power applied from the first antenna module 110. The fifth antenna module 160 transmits a signal to confirm whether the cover for the portable terminal 100 is positioned within a UWB zone 60. When receiving a response signal from one or more anchors 40, the fifth antenna module 160 determines that the cover for the portable terminal 100 is positioned within the UWB zone 60.

The fifth antenna module 160 communicates with the external IoT device 30 through the anchor 40 when the cover for the portable terminal 100 is positioned within the UWB zone 60. The fifth antenna module 160 transmits IoT data to the external IoT device 30 through one anchor 40 among one or more anchors 40 installed in the UWB zone 60. The fifth antenna module 160 may also receive IoT control information from the external IoT device 30 through one anchor 40 among one or more anchors 40 installed in the UWB zone 60.

The fifth antenna module 160 collects distance information by communicating with one or more anchors 40 installed in the UWB zone 60. The fifth antenna module 160 detects a distance from each anchor 40 by communicating with one or more anchors 40 positioned within the UWB zone 60. The fifth antenna module 160 transmits distance information to an external positioning server 50 through the anchor 40 positioned within the UWB zone 60.

Figure 6:
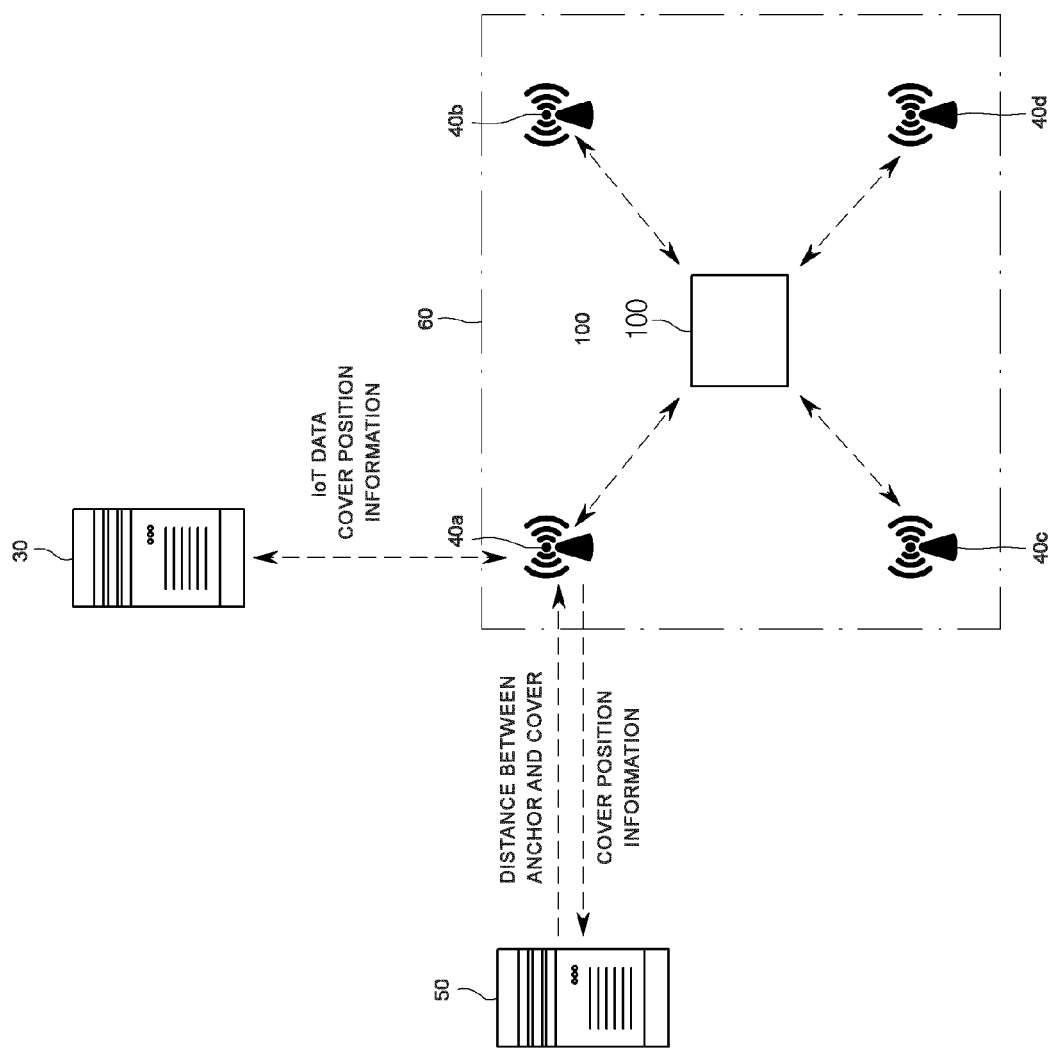

For example, referring to FIG. 6, it is assumed that the first anchor 40, the second anchor 40, the third anchor 40, and the fourth anchor 40 are installed in the UWB zone 60. The fifth antenna module 160 detects a distance of the first anchor 40, which is a distance from the first anchor 40, through the communication with the first anchor 40. The fifth antenna module 160 detects the distance of the second anchor 40 that is the distance from the second anchor 40 through communication with the second anchor 40. The fifth antenna module 160 detects a distance of the third anchor 40, which is a distance from the third anchor 40, through the communication with the third anchor 40. The fifth antenna module 160 detects a distance of the fourth anchor 40, which is a distance from the fourth anchor 40, through the communication with the fourth anchor 40. The fifth antenna module 160 transmits the distance of the first anchor 40 to the distance of the fourth anchor 40 to the positioning server 50 through the first anchor 40.

The positioning server 50 detects the position information of the cover for the portable terminal 100 by using the distance of the first anchor 40 to the distance of the fourth anchor 40. The positioning server 50 transmits the detected position information to the cover for the portable terminal 100 through the first anchor 40.

The fifth antenna module 160 transmits the IoT data received from one of the first antenna module 110, the second antenna module 120, and the fourth antenna module 140 to the external IoT device 30 through the fourth anchor 40. At this time, the fifth antenna module 160 may transmit the position information to the external IoT device 30 together with the IoT data.

The control module 150 sets an antenna module to communicate with the portable terminal 10. The control module 150 sets one of the first antenna module 110, the second antenna module 120, and the fourth antenna module 140 as an antenna module to communicate with the portable terminal 10 based on the amount of data.

The control module 150 sets an antenna module to communicate with the external IoT device 30. When the fifth antenna module 160 determines that the cover for the portable terminal 100 is positioned within the UWB zone 60, the control module 150 sets the fifth antenna module 160 as an antenna module to be communicated. When the fifth antenna module 160 determines that the cover for the portable terminal 100 is not positioned within the UWB zone 60, the control module 150 sets the third antenna module 130 as an antenna module to be communicated.

That is, the control module 150 controls the first antenna module 110 to supply driving power to the fifth antenna module 160. When the fifth antenna module 160 determines that the cover for the portable terminal 100 is positioned within the UWB zone 60, the control module 150 sets the fifth antenna module 160 as an antenna module to be communicated, and controls the first antenna module 110 to maintain the driving power supply to the fifth antenna module 160. When the fifth antenna module 160 determines that the cover for the portable terminal 100 is not positioned within the UWB zone 60, the control module 150 blocks the driving power supply to the fifth antenna module 160, and controls the first antenna module 110 to supply driving power to the third antenna module 130.

Figure 7:
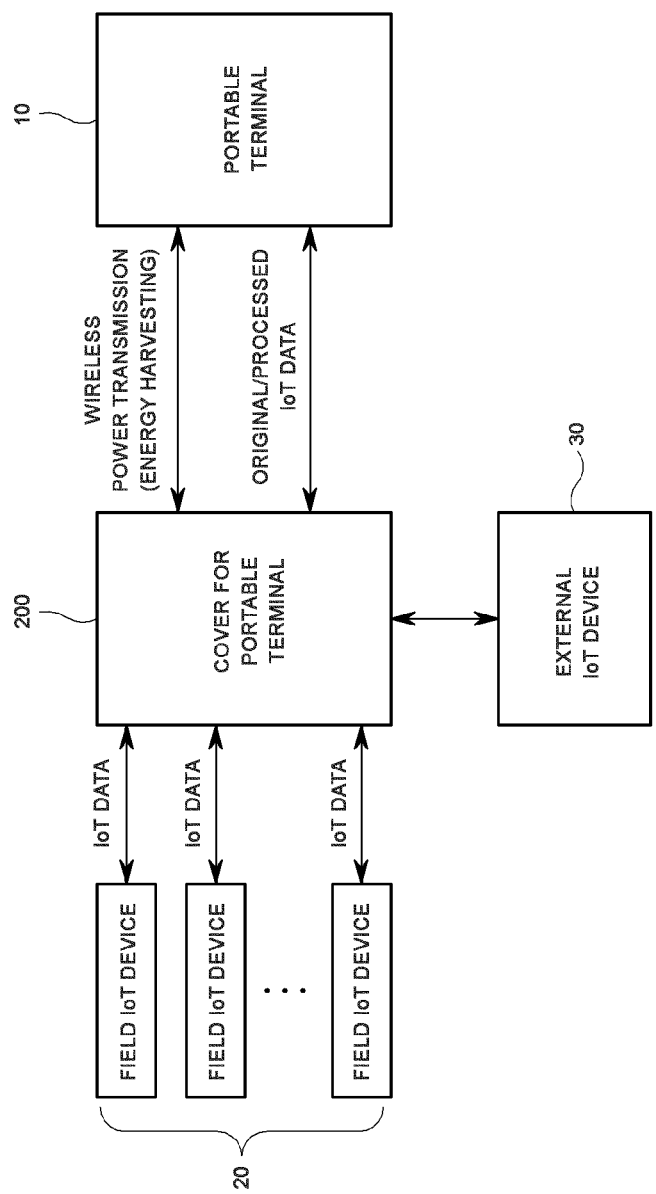
FIGS. 7 and 8 are diagrams for explaining a cover for a portable terminal according to a second exemplary embodiment of the present disclosure.

Referring to FIG. 7, a cover for a portable terminal 200 according to a second exemplary embodiment of the present disclosure may also collect IoT data directly from the field IoT device 20. That is, the cover for the portable terminal 200 collects the IoT data from the field IoT device 20 to transmit the IoT data to the portable terminal 10 or the external IoT device 30. At this time, the cover for the portable terminal 200 transmits the original IoT data, which is the IoT data collected from the field IoT device 20, or the processed IoT data, which is the IoT data processed by the portable terminal 10.

Figure 8:
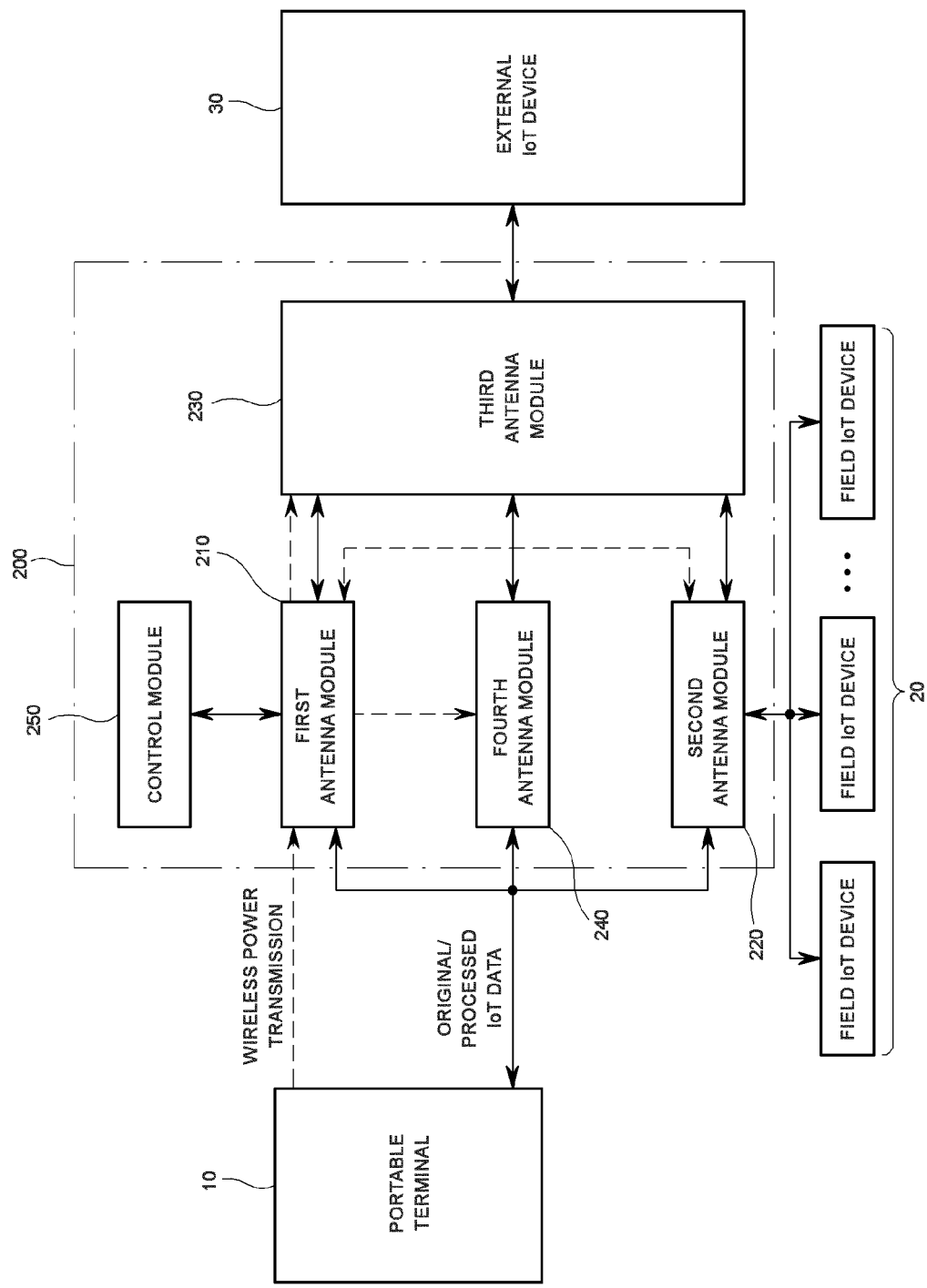

Referring to FIG. 8, the cover for the portable terminal 200 includes a first antenna module 210, a second antenna module 220, a third antenna module 230, a fourth antenna module 240, and a control module 250.

The first antenna module 210 performs wireless power transmission and short range communication with the portable terminal 10. The first antenna module 210 is driven by receiving wireless power through wireless power transmission with the portable terminal 10. The first antenna module 210 transmits the IoT data received from the second antenna module 220 to the portable terminal 10. As an example, the first antenna module 210 is an NFC antenna module capable of wireless power transmission and short range communication.

The first antenna module 210 receives power from the portable terminal 10. The first antenna module 210 receives power through energy harvesting using wireless power transmission with the portable terminal 10. As an example, the first antenna module 210 receives power through wireless power transmission with the NFC antenna module embedded in the portable terminal 10. The first antenna module 210 performs wireless power transmission with the portable terminal 10 in one of a magnetic resonance method or a magnetic induction method.

The first antenna module 210 supplies the power supplied from the portable terminal 10 through wireless power transmission to the second antenna module 220, the third antenna module 230, the fourth antenna module 240, and the control module 250. The first antenna module 210 may selectively supply power to the third antenna module 230 and the fourth antenna module 240 based on the amount of data transceived with the portable terminal 10.

The first antenna module 210 transmits IoT data to the portable terminal 10. The first antenna module 210 has the increased amount of data to be transmitted to the portable terminal 10 when the size of the IoT data is larger than the transmission capacity of the first antenna module 210 or the number of field IoT devices 20 connected (paired) to the second antenna module 220 increases. When the size of the data (that is, IoT data) to be transmitted from the portable terminal 10 is a setting size or less and the number of field IoT devices 20 connected to the second antenna module 220 is a setting number or less, the first antenna module 210 transmits the IoT data to the portable terminal 10.

The second antenna module 220 is driven by the power supplied through the first antenna module 210. The second antenna module 220 transmits and receives data to and from the portable terminal 10. Since the power supplied from the first antenna module 210 is lower than the power supplied from the portable terminal 10, the second antenna module 220 is configured as a short range communication antenna module with low power consumption. As an example, the second antenna module 220 is a Bluetooth Low Energy (BLE) antenna module capable of operating at low power.

The second antenna module 220 is paired with the field IoT device 20 to collect IoT data from the field IoT device 20. The second antenna module 220 transmits the IoT data to the portable terminal 10. When the IoT data exceeds the data transmission amount of the first antenna module 210, the second antenna module 220 is driven by wireless power to transmit the IoT data to the portable terminal 10.

When the size of the IoT data to be transmitted to the portable terminal 10 exceeds a first setting size or the number of field IoT devices 20 connected exceeds a first setting number, the second antenna module 220 may also transmit the IoT data to the portable terminal 10.

The third antenna module 230 transmits the IoT data to the external IoT device 30 through the IoT network. The third antenna module 230 transmits the processed IoT data received from the portable terminal 10 or the original IoT data received from the second antenna module 220 to the external IoT device 30. As an example, the third antenna module 230 is an antenna module such as LoRa, Sigfox, or NB-IoT which may be connected to the IoT network.

The fourth antenna module 240 transmits and receives data to and from the portable terminal 10. The fourth antenna module 240 is configured as an antenna module having a higher data transmission amount than the second antenna module 220. As an example, the fourth antenna module 240 is a Wi-Fi antenna module having a higher data transmission amount than the second antenna module 220.

The fourth antenna module 240 transmits IoT data exceeding the data transmission amount of the second antenna module 220 to the portable terminal 10. The fourth antenna module 240 is driven by wireless power to transmit the IoT data to the portable terminal 10 when the IoT data exceeds the data transmission amount of the second antenna module 220.

When the size of the IoT data exceeds a second setting size or the number of field IoT devices 20 connected to the second antenna module 220 exceeds a second setting number, the fourth antenna module 240 may be driven by wireless power to transmit the IoT data to the portable terminal 10. Here, the second setting size and the second setting number are larger than the first setting size and the first setting number.

The control module 250 sets an antenna module to communicate with the portable terminal 10. The control module 250 sets one of the first antenna module 210, the second antenna module 220, and the fourth antenna module 240 as an antenna module to communicate with the portable terminal 10 based on the amount of data.

The control module 250 sets the first antenna module 210 as an antenna module to be communicated when the amount of data is the data transmission amount of the first antenna module 210 or less. The control module 250 sets the second antenna module 220 as an antenna module to be communicated when the amount of data exceeds the data transmission amount of the first antenna module 210 and is the data transmission amount of the second antenna module 220 or less. The control module 250 sets the third antenna module 230 as an antenna module to be communicated when the amount of data exceeds the data transmission amount of the second antenna module 220.

The control module 250 controls power supply to the antenna module set as an antenna module to be communicated. When the first antenna module 210 is set as an antenna module to be communicated, the control module 250 controls the first antenna module 210 to stop power supply to the second antenna module 220 and the fourth antenna module 240. When the second antenna module 220 is set as an antenna module to be communicated, the control module 250 controls the first antenna module 210 to stop power supply to the fourth antenna module 240. When the fourth antenna module 240 is set as an antenna module to be communicated, the control module 250 controls the first antenna module 210 to stop power supply to the second antenna module 220.

Meanwhile, the cover for the portable terminal 200 may also transmit the data stored in the portable terminal 10 to the external IoT device 30 through the IoT network.

Figure 9:
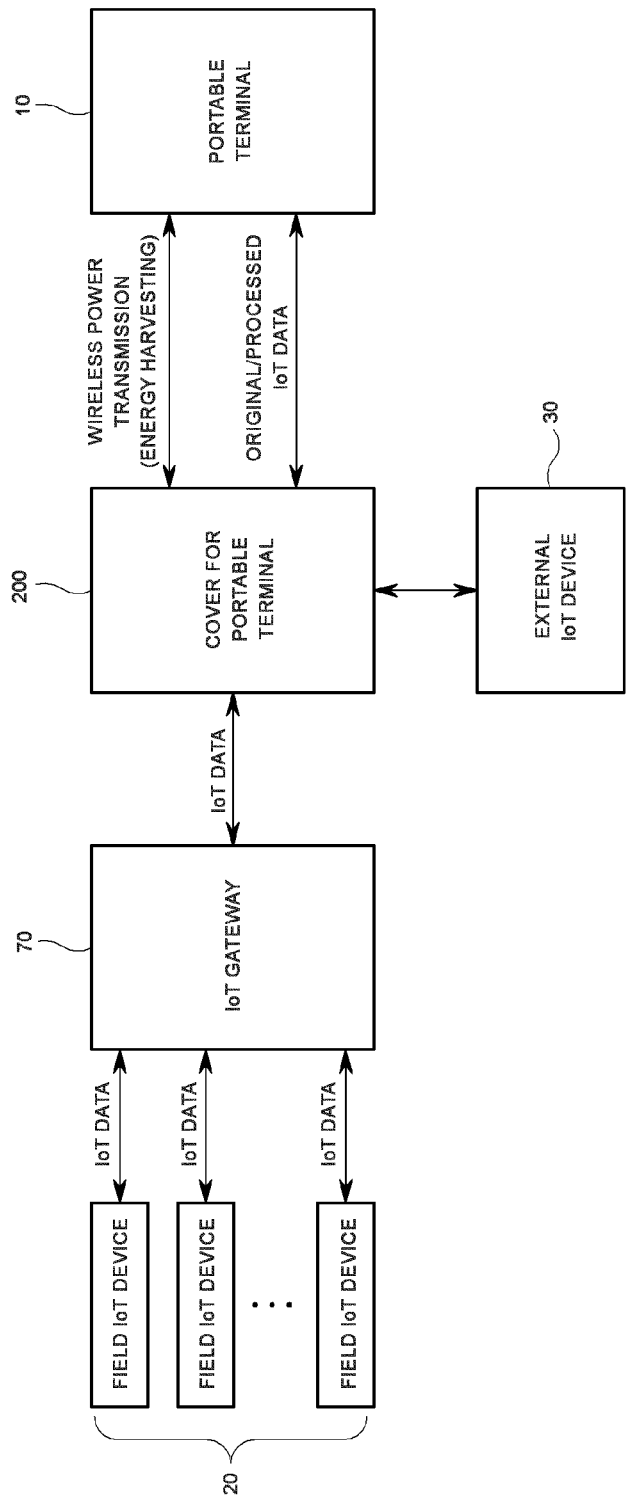
FIGS. 9 to 12 are diagrams for explaining modified examples of the cover for the portable terminal according to the second exemplary embodiment of the present disclosure.
Figure 10:
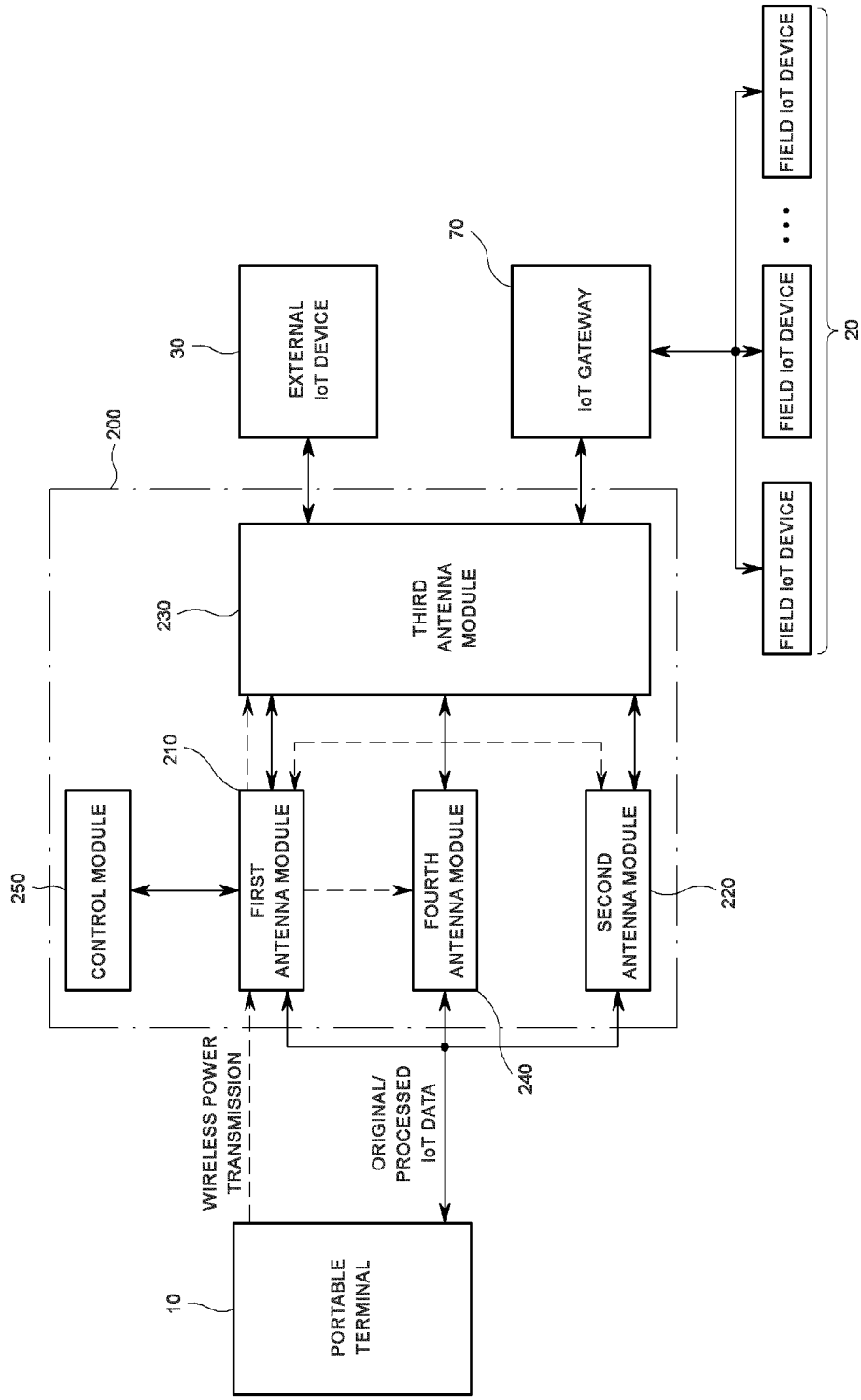

Referring to FIGS. 9 and 10, the cover for the portable terminal 200 according to an exemplary embodiment of the present disclosure may also collect the IoT data through the IoT communication with an IoT gateway 70.

The IoT gateway 70 collects IoT data from the field IoT devices 20 through BLE communication or Wi-Fi communication. The IoT gateway 70 transmits the collected IoT data to the outside through the IoT communication. As an example, the IoT communication is one of LoRa, Sigfox, and NB-IoT.

The cover for the portable terminal 200 collects the IoT data from the IoT gateway 70 when recognizing the IoT gateway 70. The cover for the portable terminal 200 collects the IoT data from the IoT gateway 70 through the IoT communication when the IoT gateway 70 exists within an IoT communication range.

The third antenna module 230 collects the IoT data through the IoT communication with the IoT gateway 70. The third antenna module 230 collects the IoT data directly from the IoT gateway 70. One of the first antenna module 210, the second antenna module 220, and the fourth antenna module 240 transmits the IoT data collected by the third antenna module 230 to the portable terminal 10.

Figure 11:
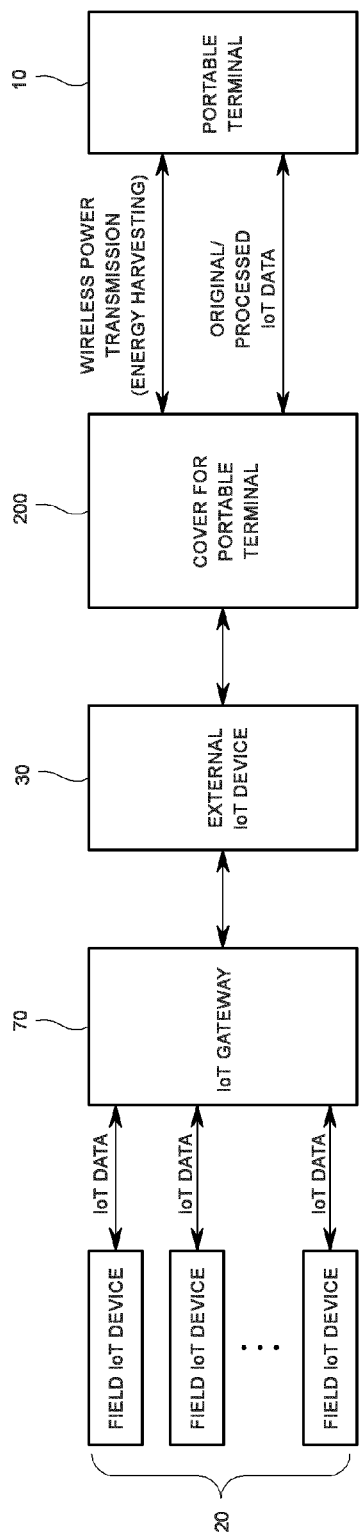
Figure 12:
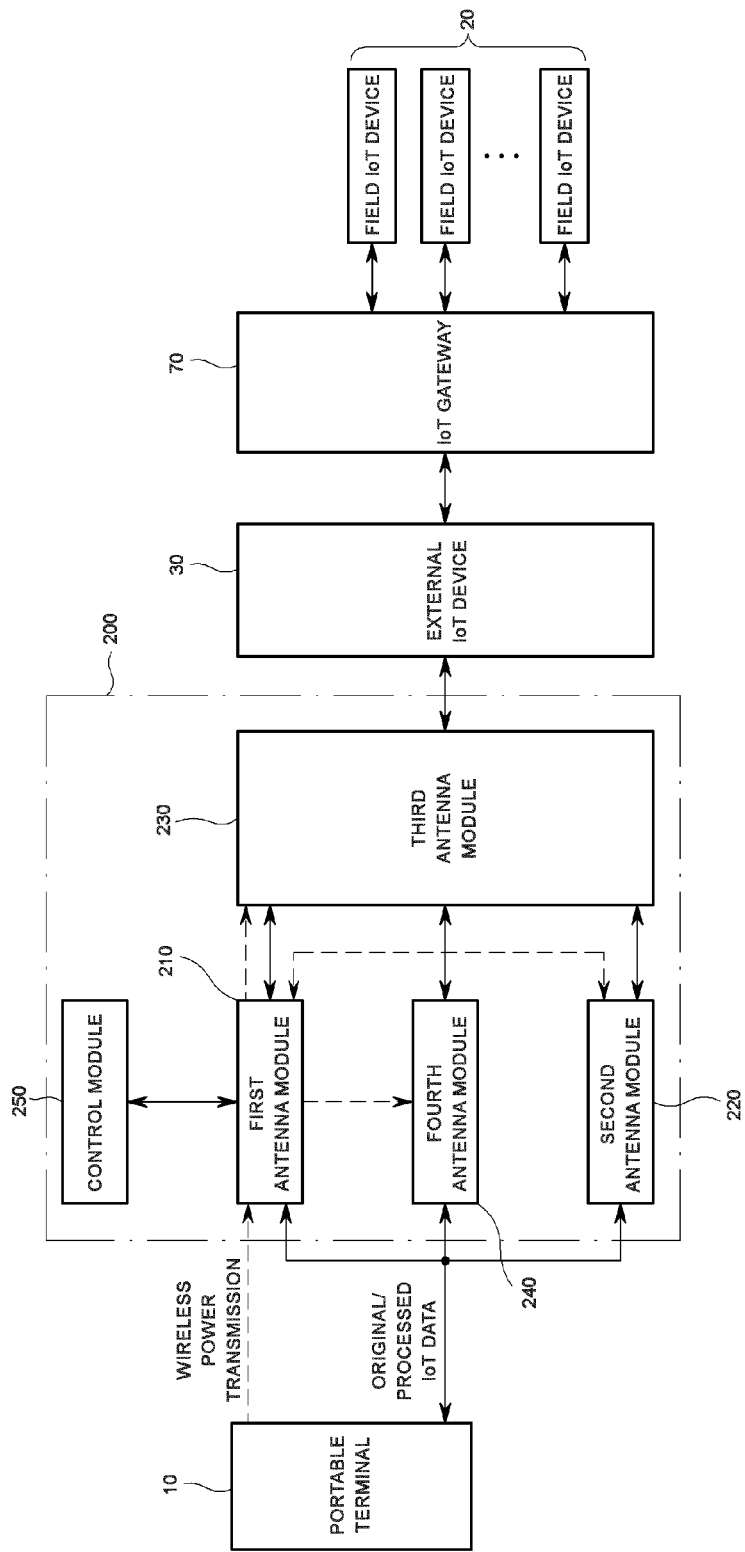

Referring to FIGS. 11 and 12, the cover for the portable terminal 200 may also collect the IoT data from the external IoT device 30 when not recognizing the IoT gateway 70. The cover for the portable terminal 200 collects the IoT data from the external IoT device 30 through the IoT communication when the IoT gateway 70 exists at a position out of the IoT communication range.

The external IoT device 30 collects the IoT data from the field IoT device 20 through the IoT gateway 70. The third antenna module 230 indirectly collects the IoT data by being connected to the external IoT device 30 through the IoT network. The control module 250 controls one of the first antenna module 210, the second antenna module 220, and the fourth antenna module 240 to transmit the IoT data collected by the third antenna module 230 to the portable terminal 10.

Although the preferred exemplary embodiments according to the present disclosure have been described above, they may be modified in various forms, and it is understood that those skilled in the art may carry out various modifications and changes without departing from the claims of the present disclosure.

The invention claimed is:

1. A cover for a portable terminal comprising:
   a first antenna module which generates driving power through energy harvesting with the portable terminal;
   a second antenna module which is driven by the driving power generated by the first antenna module; and
   a third antenna module which is driven by the driving power generated by the first antenna module,
   wherein one of the first antenna module and the second antenna module communicates with the portable terminal,
   wherein the third antenna module connects to an Internet of Things (IoT) network,
   wherein communication methods of first and second antenna modules are different from a communication method of the third antenna module, wherein the portable terminal is devoid of being embedded with a communication module that communicates with the IoT network connected with the third antenna module, wherein the one of the first antenna module and the second antenna module collects IoT data from the portable terminal, wherein the third antenna module transmits the IoT data collected by one of the first antenna module and the second antenna module to an external IoT device through the IoT network, and wherein the second antenna module is driven when the number of field IoT devices connected to the portable terminal exceeds a first setting number.

2. The cover for the portable terminal of claim 1, wherein the second antenna module is driven when the IoT data exceeds a data transmission amount of the first antenna module.

3. The cover for the portable terminal of claim 1, wherein the second antenna module is driven when the size of the IoT data exceeds a first setting size.

4. The cover for the portable terminal of claim 1, further comprising a fourth antenna module which is driven by the driving power generated by the first antenna module to collect the IoT data from the portable terminal,
wherein the fourth antenna module is driven when the IoT data exceeds the data transmission amount of the second antenna module.

5. The cover for the portable terminal of claim 4, wherein the fourth antenna module determines that the IoT data exceeds the data transmission amount of the second antenna module when the size of the IoT data exceeds a second setting size or the number of field IoT devices connected to the portable terminal exceeds a second setting number.

6. The cover for the portable terminal of claim 4, further comprising a fifth antenna module which is driven by the driving power generated by the first antenna module, and transmits the IoT data collected by one of the first antenna module, the second antenna module, and the fourth antenna module to the external IoT device.

7. The cover for the portable terminal of claim 6, wherein the fifth antenna module transmits the IoT data to the external IoT device through one of a plurality of anchors.

8. The cover for the portable terminal of claim 6, wherein the fifth antenna module transmits position information collected by communicating with the plurality of anchors to the external IoT device.

9. The cover for the portable terminal of claim 8, wherein the fifth antenna module collects the position information by communicating with a positioning server through one of the plurality of anchors.

10. The cover for the portable terminal of claim 6, wherein the first antenna module comprises a NFC antenna, the second antenna module comprises a BLE antenna, the third antenna module comprises one of a LoRa antenna, a Sigfox antenna, and a NB-IoT antenna, the fourth antenna module comprises a Wi-Fi antenna, and the fifth antenna module comprises a UWB antenna.

11. A cover for a portable terminal fastened to the portable terminal comprising:
a first antenna module which generates driving power through energy harvesting with the portable terminal;
a second antenna module which is driven by the driving power generated by the first antenna module, communicates with the portable terminal and collects Internet of Things (IoT) data from one or more field IoT devices; and
a third antenna module which is driven by the driving power generated by the first antenna module,
wherein the third antenna module connects to an IoT (Internet of Things) network,
wherein communication methods of first and second antenna modules are different from a communication method of the third antenna module,
wherein the portable terminal is in which no communication module that communicates with the IoT network connected with the third antenna module is embedded,
wherein the third antenna module transmits the IoT data collected by the second antenna module to an external IoT device through the IoT network, and
wherein the second antenna module is driven when the number of field IoT devices connected to the portable terminal exceeds a first setting number.

12. The cover for the portable terminal of claim 11, wherein one of the first antenna module and the second antenna module transmits the IoT data to the portable terminal.

13. The cover for the portable terminal of claim 11, wherein the second antenna module is driven by the driving power to transmit the IoT data to the portable terminal when the IoT data exceeds a data transmission amount of the first antenna module.

14. The cover for the portable terminal of claim 11, wherein the second antenna module is driven by the driving power to transmit the IoT data to the portable terminal when the size of the IoT data exceeds a first setting size.

15. The cover for the portable terminal of claim 11, further comprising a fourth antenna module which is driven by the driving power to transmit the IoT data to the portable terminal,
wherein the fourth antenna module is driven when the IoT data exceeds the data transmission amount of the third antenna module.

16. The cover for the portable terminal of claim 15, wherein the fourth antenna module determines that the IoT data exceeds the data transmission amount of the fourth antenna module when the size of the IoT data exceeds a second setting size or the number of field IoT devices connected to the portable terminal exceeds a second setting number.

17. The cover for the portable terminal of claim 16, wherein the first antenna module comprises a NFC antenna, the second antenna module comprises a BLE antenna, the third antenna module comprises one of a LoRa antenna, a Sigfox antenna, and a NB-IoT antenna, and the fourth antenna module comprises a Wi-Fi antenna.

18. The cover for the portable terminal of claim 11, wherein the third antenna module collects the IoT data from the field IoT device.

19. The cover for the portable terminal of claim 11, wherein the third antenna module collects IoT data from an IoT gateway which is positioned within a communication range.

20. The cover for the portable terminal of claim 11, wherein the third antenna module collects the IoT data of the IoT gateway, which is positioned out of a communication range, through the external IoT device.

* * * * *